United States Patent
Yang (10) Patent No.: US 10,021,588 B1
(45) Date of Patent: Jul. 10, 2018

(54) METHODS AND SYSTEMS FOR REDUCING INBOUND REQUEST TRAFFIC IN A WIRELESS NETWORK

(71) Applicant: MOTOROLA SOLUTIONS, INC., Chicago, IL (US)

(72) Inventor: Yunhai Yang, Elgin, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/587,123

(22) Filed: May 4, 2017

(51) Int. Cl.
| | |
|---|---|
| *H04B 7/24* | (2006.01) |
| *H04W 28/02* | (2009.01) |
| *H04W 60/04* | (2009.01) |
| *H04W 72/12* | (2009.01) |
| *H04W 64/00* | (2009.01) |
| *H04W 88/12* | (2009.01) |
| *H04L 29/12* | (2006.01) |

(52) U.S. Cl.
CPC ....... *H04W 28/0252* (2013.01); *H04W 60/04* (2013.01); *H04W 64/00* (2013.01); *H04W 72/121* (2013.01); *H04L 61/6068* (2013.01); *H04W 88/12* (2013.01)

(58) Field of Classification Search
CPC ......... H04W 4/14; H04W 4/18; H04W 88/16; H04L 67/104; H04L 63/0435; H04L 63/08; H04L 63/10
USPC ...... 370/352, 328; 455/419, 435.1; 709/228, 709/221; 707/638
See application file for complete search history.

(56) References Cited

U.S. PATENT DOCUMENTS

| | | | |
|---|---|---|---|
| 4,723,264 A | 2/1988 | Sasuta et al. | |
| 9,271,253 B2 | 2/2016 | Roussev et al. | |
| 2008/0205327 A1* | 8/2008 | Tu | H04W 52/0216 370/328 |
| 2009/0144433 A1* | 6/2009 | Breau | H04W 8/30 709/228 |
| 2013/0218839 A1 | 8/2013 | Serlet | |

* cited by examiner

*Primary Examiner* — Phuoc H Doan
(74) *Attorney, Agent, or Firm* — Michael Best & Friedrich LLP (57) ABSTRACT

Methods and systems for reducing inbound request traffic in a wireless network. One method includes receiving, via a network interface of a controller, a registration request from a communication device. The method further includes determining, with an electronic processor of the controller and in response to receiving the registration request, predicted communication device configuration data. The electronic processor determines the predicted communication device configuration data as a function of a plurality of previously stored communication device configuration data states associated with the communication device. The method further includes transmitting, with the electronic processor via the network interface, a message to the communication device. The message includes at least a portion of the predicted communication device configuration data.

20 Claims, 4 Drawing Sheets

METHODS AND SYSTEMS FOR REDUCING INBOUND REQUEST TRAFFIC IN A WIRELESS NETWORK

BACKGROUND OF THE INVENTION

Communication devices that communicate over a communication network (for example, a trunked radio communication system) often must register with a centralized device (for example, a zone controller) upon powering on. For example, communication devices often transmit a registration request to the centralized device over a random access inbound communication channel. Communication devices may also transmit subsequent service requests over the random access inbound communication channel to establish a state of service configuration parameters of the communication device. When many communication devices are powered on within a short time period, a high volume of inbound traffic is present on the inbound communication channel. This high volume of inbound traffic may prevent registration requests and subsequent service requests from being received by the centralized device and may reduce the functionality of other communication services in the communication system, such as voice service and data service.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method for reducing inbound request traffic in a wireless network. The method includes receiving, via a network interface of a controller, a registration request from a communication device. The method further includes determining, with an electronic processor of the controller and in response to receiving the registration request, predicted communication device configuration data. The electronic processor determines the predicted communication device configuration data as a function of a plurality of previously stored communication device configuration data states associated with the communication device. The method further includes transmitting, with the electronic processor via the network interface, a message to the communication device. The message includes at least a portion of the predicted communication device configuration data.

Another embodiment provides a controller that communicates over a wireless network. The controller includes a memory, a network interface, and an electronic processor. The controller is configured to receive, via the network interface, a registration request from a communication device. The controller is further configured to determine, with the electronic processor in response to receiving the registration request, predicted communication device configuration data. The electronic processor determines the predicted communication device configuration data as a function of a plurality of previously stored communication device configuration data states associated with the communication device. The controller is further configured to transmit, with the electronic processor via the network interface, a message to the communication device. The message includes at least a portion of the predicted communication device configuration data.

Another embodiment provides a wireless communication system including a communication device and a controller. The communication device includes a first memory, a first network interface, and a first electronic processor. The controller is configured to communicate with the communication device over a wireless network, and includes a second memory, a second network interface, and a second electronic processor. The communication device is configured to transmit a registration request to the controller. The controller is configured to determine predicted communication device configuration data as a function of a plurality of previously stored communication device configuration data states associated with the communication device. The controller is further configured to transmit a message to the communication device. The message includes at least a portion of the predicted communication device configuration data. The communication device is further configured to determine whether the predicted communication device configuration data is correct.

Figure 1:
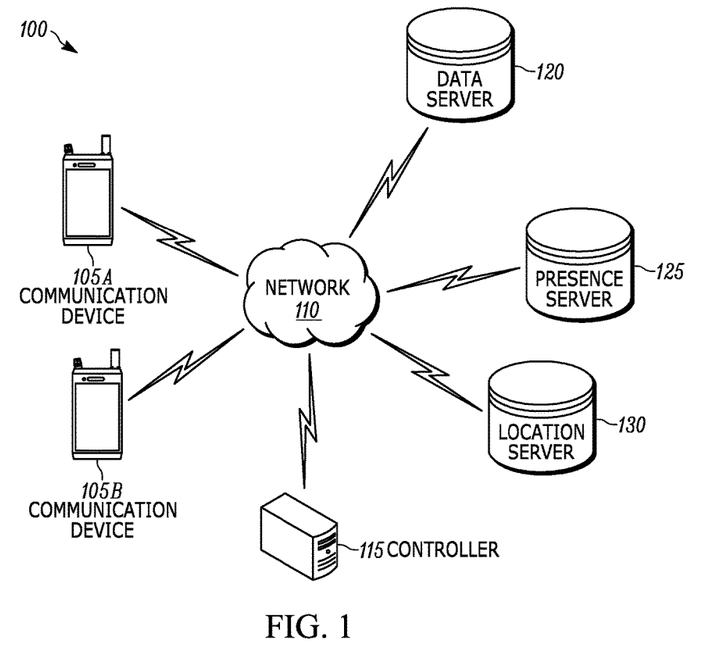
FIG. 1 is a diagram of a communication system according to one embodiment.

FIG. 1 is a diagram of a communication system 100 according to one embodiment. In the example illustrated, the communication system 100 includes communication devices 105A and 105B. In the following description, when explaining how a single communication device functions, a reference to communication device 105 is used. It is not necessary, however, that the communication devices 105A and 105B are identical. The communication devices 105A and 105B are merely examples. In some embodiments, the communication system 100 may include more or fewer communication devices than illustrated in FIG. 1.

The communication devices 105A and 105B communicate with each other over a network 110 (for example, by sending and receiving radio signals). The network 110 may include wireless and wired portions. All or parts of the network 110 may be implemented using various existing specifications or protocols, for example, the Project 25 (P25) specification, Terrestrial Trunked Radio (TETRA), Digital Mobile Radio (DMR), and Public Safety Long Term Evolution (LTE). The network 110 may also include future developed networks. In some embodiments, the network 110 may also include a combination of the networks mentioned. In some embodiments, the communication devices 105A and 105B may communicate directly with each other using a communication channel or connection that is outside of the network 110. For example, the communication devices 105A and 105B may communicate directly with each other when they are within a predetermined distance from each other.

The communication system 100 also includes a controller 115 that monitors and controls communication between the communication devices 105A and 105B in some embodiments (for example, a zone controller). In some embodiments, the controller 115 is a computer maintained, for example, at a call center or public safety command center. In some embodiments, the controller 115 controls communication between the communication devices 105A and 105B over the network 110 in accordance with talk group affiliation as explained in greater detail below. For example, the controller 115 receives registration requests from communication devices 105 over one or more inbound control channels (for example, when each communication device 105 is powered on). In response to the registration requests, the controller 115 may register the communication device 105 with the network 110. For example, the controller 115 assigns each communication device 105 to an affiliated talk group and assigns each communication device 105 an Internet Protocol (IP) address as explained in greater detail below.

In some embodiments, the controller 115 registers the communication device 105 with the network 110 by communicating with one or more of a data server 120, a presence server 125, and a location server 130. For example, the controller 115 may communicate with the data server 120 to perform a context activation for the communication device 105. In some embodiments, the context activation assigns an Internet Protocol address to the communication device 105 until the communication device 105 is powered off. In some embodiments, the data server 120 routes data messages to and from communication devices 105 within the network 110.

In some embodiments, the controller 115 registers the communication device 105 to the presence server 125 to allow the presence server 125 to inform other application servers that the communication device 105 is registered with the network 110. In other words, in some embodiments, the presence server 125 acts as a proxy for other application servers (for example, the location server 130, monitoring servers, video servers, and the like) by informing these other application servers that the communication device 105 is present within the network 110. The other application servers may then take corresponding action based on this information (for example, exchange data with the communication device 105).

In some embodiments, the controller 115 registers the communication device to the location server 130 and provides location update parameters (for example, cadence, distance, and the like) to the communication device 105 from the location server 130 as explained in greater detail below. Although FIG. 1 shows the servers 120, 125, and 130 as separate components, in some embodiments, one or more of the servers 120, 125, and 130 may be combined with each other or may be integrated into the controller 115. In some embodiments, the controller 115 transmits registration information (for example, the assigned Internet Protocol address of the communication device) to each communication device over one or more outbound communication channels.

In some embodiments, the communication system 100 also includes a plurality of site controllers (not shown) that each control communication between a plurality of communication devices within a predetermined area (in other words, at a respective site). In such embodiments, the controller 115 communicates with each site controller to control communication between the respective communication devices controlled by each site controller.

As illustrated in FIG. 1, the communication device 105 may be a handheld communication device, for example, a mobile telephone or other portable communication device, mobile radio, smart watch or other smart wearable, and may be located in or be a part of a drone or unmanned aerial vehicle, or may be another device configured to communicate over the network 110. In some embodiments, the communication device 105 may be a handheld radio carried by a public safety officer or first responder, such as a police officer. In some embodiments, the communication device 105 may be a mobile communication device mounted in or on a vehicle (for example, a police vehicle, an ambulance, or the like). In some embodiments, the communication device 105 may be a device maintained, for example, at a call center or public safety command center.

In some embodiments, the communication devices 105 are affiliated with or scan one or more talk groups associated with the network 110. As used herein, a talk group is a virtual radio channel (a shared channel selected from a group of channels or available frequencies) used for communication between a plurality of communications devices, other devices, or a combination thereof. A talk group may be defined or assigned based on various criteria. For example, a talk group may be established for devices associated with a particular public safety agency or department, a particular incident, a particular member role or designation, or a combination thereof. For example, a talk group may relate to an organization of bus drivers, a group of police officers, a fire incident, or a combination thereof. Similarly, a talk group may relate to members having the same role or designation (for example, police officer, detective, supervisor, paramedic, firefighter, and the like). As another example, paramedics and firefighters might be grouped into two different talk groups even though they are responding to the same public safety incident. As mentioned, in some embodiments, the controller 115 may control talk group affiliations of the communication devices 105.

Figure 2:
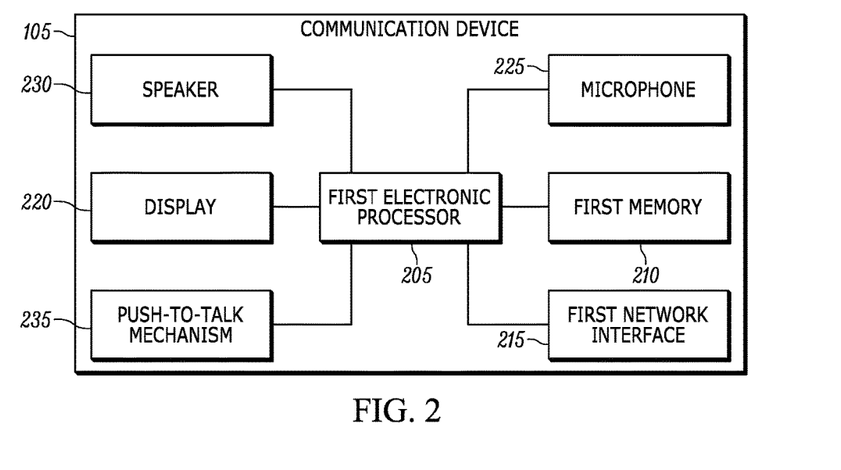
FIG. 2 is a diagram of a communication device included in the communication system of FIG. 1 according to one embodiment.

FIG. 2 is a block diagram of a communication device 105 of the communication system 100 according to one embodiment. In the example shown, the communication device 105 includes a first electronic processor 205 (for example, a microprocessor or another electronic device). The first electronic processor 205 may include input and output interfaces (not shown) and be electrically connected to a first memory 210, a first network interface 215, a first display 220, a first microphone 225, a first speaker 230, and a push-to-talk mechanism 235. In some embodiments, the communication device 105 may include fewer or additional components in configurations different from that illustrated in FIG. 2. For example, in some embodiments, the communication device 105 also includes a camera and a location component (for example, a global positioning system (GPS) receiver). In some embodiments, the communication device 105 performs additional functionality than the functionality described below.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 sends and receives data to and from the network 110. For example, the first network interface 215 may include a transceiver for wirelessly communicating with the network 110. Alternatively or in addition, the first network interface 215 may include a connector or port for receiving a wired connection to the network 110, such as an Ethernet cable. The first electronic processor 205 receives electrical signals representing sound from the first microphone 225 and may communicate information relating to the electrical signals over the network 110 through the first network interface 215 to other devices, for example, to another communication device 105. Similarly, the first electronic processor 205 may output data received from the network 110 through the first network interface 215, for example from another communication device 105, through the first speaker 230, the first display 220, or a combination thereof.

In some embodiments, the push-to-talk mechanism 235 allows a user of the communication device 105 to initiate communication over the network 110. For example, when the first electronic processor 205 detects that the push-to-talk mechanism 235 is enabled, the first electronic processor 205 communicates sound data detected by the first microphone 225 over the network 110. In some embodiments, the sound data is communicated to other communication devices that are affiliated with a talk group to which the communication device 105 is transmitting. When the first electronic processor 205 detects that the push-to-talk mechanism 235 is no longer enabled (for example, has been released), the first electronic processor 205 stops the communication of the sound data. In some embodiments, the push-to-talk mechanism 235 may be a mechanical button or knob or a virtual button or knob displayed on the first display 220, which may include a touchscreen. In some embodiments, the push-to-talk mechanism 235 may be a mechanical button or knob on an accessory that is separate from and communicates with the communication device 105 (for example, a button or knob on a remote speaker-microphone).

As noted, the communication devices 105 are affiliated with or scan one or more talk groups associated with the network 110. In some embodiments, the communication devices 105 have a level of affiliation with each available talk group identified by information stored in the first memory 210 of each communication device 105. For example, each communication device 105 may have an affiliated talk group such that when the push-to-talk mechanism 235 is pressed, sound data from the communication device 105 is transmitted to the affiliated talk group. In some embodiments, the communication device 105 joins any call intended for its affiliated talk group. All other available talk groups identified by information stored in the first memory 210 may be merely for receiving data from other communication devices (in other words, for scanning activity of the other talk groups). Such talk groups may be referred to as scanned talk groups. In some embodiments, the communication device 105 joins a call intended for one of its scanned talk groups only when its affiliated talk group does not have a call in progress.

To join a particular talk group (in other words, to configure a particular talk group to be the affiliated talk group of the communication device 105), the communication device 105 may receive an input representing a user selection of a particular available talk group. For example, the first memory 210 of the communication device 105 may store a list of one or more available talk groups (for example, identifiers of available talk groups). The list of available talk groups may be displayed on a user interface of the first display 220. The user interface of the first display 220 may receive an input from a user selecting one of the available talk groups. In some embodiments, available talk groups may be assigned to discrete positions of a rotatable knob or other input mechanisms included on the communication device 105 that receive input from a user selecting one of the positions. The first electronic processor 205 determines the talk group associated with the selected position to select an available talk group.

Figure 3:
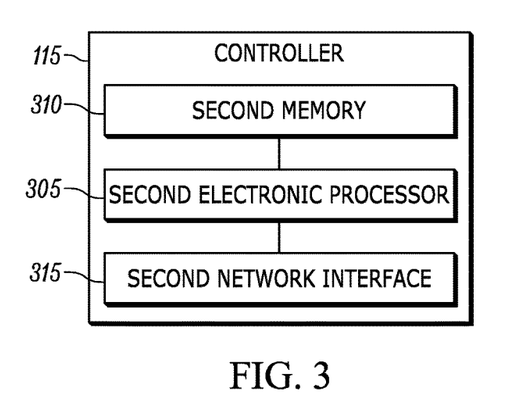
FIG. 3 is a diagram of a controller included in the communication system of FIG. 1 according to one embodiment.

FIG. 3 is a block diagram of the controller 115 according to one embodiment. In the example illustrated, the controller 115 is a computer that includes a second electronic processor 305, an input/output interface (not shown), a second memory 310, and a second network interface 315. These components are similar to those described above with respect to the communication device 105 and perform similar functions. In some embodiments, the controller 115 may include fewer or additional components in configurations different from that illustrated in FIG. 3. For example, in some embodiments, the controller 115 also includes a display similar to that described above with respect to the communication device 105. In some embodiments, the controller 115 performs additional functionality than the functionality described below. In some embodiments, the controller 115 keeps track of the affiliated talk group and the scanned talk groups of each communication device (for example, by storing information in the second memory 310). The controller 115 may also keep track of a site controller corresponding to each communication device 105. In some embodiments, when a talk group becomes active (in other words, when a call begins on the talk group), the controller 115 transmits a call grant to each site controller that includes a communication device 105 with the active talk group as an affiliated talk group or a scanned talk group. The call grant to the site controllers allows communication devices 105 associated with the active talk group to receive the call.

To allow for this control of communication between communication devices 105, in some embodiments, the controller 115 communicates with communication devices 105 over the network 110 to register communication devices 105 with the network 110. In some embodiments, the second memory 310 of the controller 115 stores communication device configuration data states associated with the communication device 105 each time the communication device 105 registers with the network 110. For example, after the communication device 105 is powered on and is registered with the network 110, the second electronic processor 305 stores communication device configuration data of the communication device 105 in the second memory 310. In some embodiments, the communication device configuration data includes at least one of an affiliated talk group of the communication device 105, a list of scanned talk groups of the communication device 105, a data capability level of the communication device 105, and a location capability level of the communication device 105.

In some embodiments, the data capability level of the communication device 105 indicates the types of communication that the communication device 105 is capable of performing (for example, voice communications, data communications, message communications, and the like). Depending on the data capability level of the communication device 105, the controller 115 may register the communication device 105 with one or more of the data server 120 and other application servers. For example, when the communication device 105 is capable of engaging in data communications, the communication device 105 registers with the data server 120. However, when the communication device 105 is not capable of engaging in data communications, the communication device 105 does not register with the data server 120.

In some embodiments, the location capability level of the communication device 105 indicates whether the communication device 105 has the capability to identify its location (in other words, whether the communication device 105 includes a location component such as a global positioning system receiver and is configured to transmit location information to the controller 115). In some embodiments, when the communication device 105 has location capability, the controller 115 registers the communication device 105 with the location server 130. For example, the controller 115 may retrieve location update parameters (for example, cadence, distance, and the like) from the location server 130 and transmit the location update parameters to the communication device 105.

In some embodiments, the location update parameters indicate a location update frequency at which the communication device 105 should transmit location information to the controller 115. For example, a distance-based location update parameter may indicate that the communication device 105 should transmit location information to the controller 115 each time the communication device 105 moves one hundred meters. As another example, a cadence-based location update parameter may indicate that the communication device 105 should transmit location information to the controller 115 every thirty seconds. In some embodiments, the location update parameters may indicate that the communication device 105 should transmit location information to the controller 115 based on both the distance-based and cadence-based location update parameters (for example, whichever previous exemplary limit occurs first). In some embodiments, the location update parameters may indicate that the communication device 105 should transmit location information to the controller 115 based on a specific event or input (for example, an emergency button being pressed on the communication device 105).

In some embodiments, when the second electronic processor 305 stores the communication device configuration data of the communication device 105, the second electronic processor 305 also stores a location of the communication device 105 from which the registration request was received and a time of day at which the registration request was received. In some embodiments, the second electronic processor 305 determines the location of the communication device 105 based on a location of a site controller that received the registration request from the communication device 105. In other embodiments, the registration request includes the location of the communication device 105 (for example, as determined by a location component of the communication device 105).

In some embodiments, at least some of the information described above as being stored by the second memory 310 (for example, communication device configuration data states, corresponding location information, and corresponding time of day information) may be stored in a database or other network element that is separate from the controller 115. In such embodiments, the separate database may communicate with the controller 115 over the network 110 such that the controller 115 receives information stored in the separate database.

As noted previously, in some embodiments, communication devices may be required to register with a centralized device such as a controller (for example, a zone controller) upon powering on before the communication devices are able to communicate over a network. In previous communication systems, the registration process involved numerous messages transmitted back and forth between the communication device and the controller. For example, a previous registration process involved the communication device sending a unit registration request to request permission to register with the network. For example, the unit registration request included site information of a site controller that received the unit registration request from the communication device. The unit registration request also included authentication information that allowed the controller to recognize and authenticate the communication device. The controller authenticated the communication device and responded to the communication device to notify the communication device that authentication was complete. The communication device then sent a talk group affiliation request that informed the controller of the affiliated talk group of the communication device. The controller assigned the communication device to the affiliated talk group based on the talk group affiliation request (for example, by storing an identification of the communication device and its affiliated talk group and site controller in the memory of the controller). The controller also responded to the talk group affiliation request to notify the communication device that the talk group affiliation request was received. The communication device then sent a data channel request to the controller to establish a context activation process with the data server as mentioned previously. The controller responded to the data channel request by assigning a data channel for the communication device and the data server. The data server then provided an Internet Protocol address to the communication device. The communication device then sent a list of scanned talk groups to the controller. In response, the controller assigned the communication device to the communication devices listed in the list of scanned talked groups (for example, by storing an identification of the communication device and its scanned talk groups in the memory of the controller). The controller also sent a message to the communication device to notify the communication device that the list of scanned talk groups was received. When the communication device had location capability, the communication device then sent a location update parameter request to retrieve location update parameters from the location server. The controller retrieved these location update parameters and transmitted them to the communication device as explained previously.

Because this previous registration process involved numerous messages back and forth between the communication device and the controller, when many communication devices were powered on within a short time period, a high volume of inbound traffic was present on a random access inbound communication channel. This high volume of inbound traffic often caused collisions between inbound messages and prevented registration requests from being received by the controller. Similarly, this high volume of inbound traffic often reduced the functionality of other services that used the communication system (for example, voice service and data service). For example, voice service requests (such as push-to-talk requests initiated by a communication device) and data service requests often use the same inbound communication channel as registration requests. As another example, the registration acknowledgement messages from the controller to communication devices are often sent over outbound communication channels shared by multiple services (such as voice service and data service).

Figure 4:
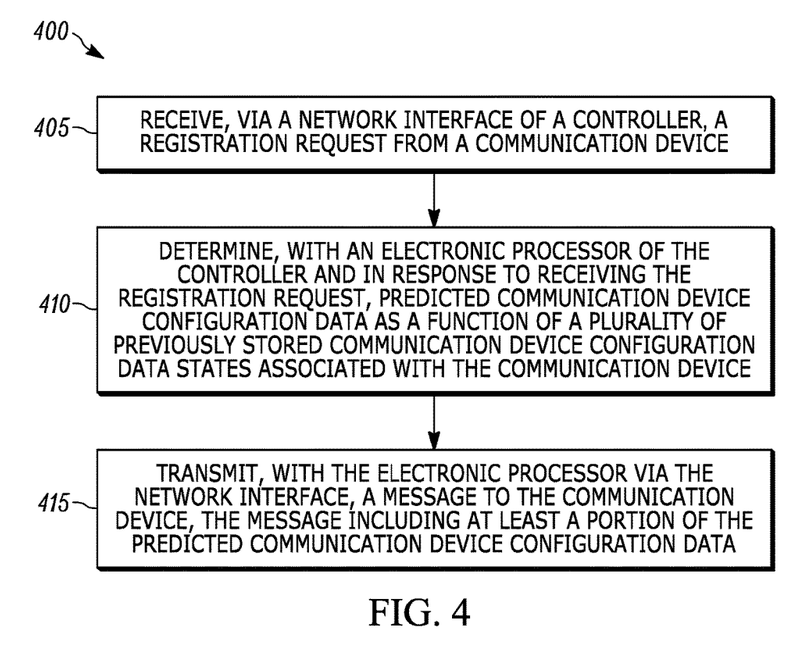
FIG. 4 is a flowchart of a method of reducing inbound request traffic in the communication system of FIG. 1 that is performed by the controller of FIG. 3 according to one embodiment.

To reduce the amount of inbound request traffic in the network 110, the controller 115 (in particular, the second electronic processor 305) may perform a method 400 illustrated in FIG. 4. At block 405, the controller 115 receives, via the second network interface 315 a registration request from a communication device 105. For example, upon powering on, the communication device 105 may transmit the registration request to the controller 115.

At block 410, the second electronic processor 305 of the controller 115 determines predicted communication device configuration data as a function of a plurality of previously stored communication device configuration data states associated with the communication device 105. For example, the predicted communication device configuration data may include a predicted affiliated talk group of the communication device 105, a predicted list of scanned talk groups of the communication device 105, the data capability level of the communication device 105, and the location capability level of the communication device 105. As mentioned previously, the second memory 310 may store communication device configuration data states associated with the communication device 105 each time the communication device 105 registers with the network 110. Thus, when the controller 115 receives a new registration request from the communication device 105, the second electronic processor 305 may use the plurality of previously stored communication device configuration data states (in other words, historical communication device configuration data) associated with the communication device 105 to predict the current communication device configuration data of the communication device 105.

In some embodiments, the second electronic processor 305 may determine at least a portion of the predicted communication device configuration data based on at least one of a location of the communication device 105 and a time of day at which the registration request was received. For example, the second electronic processor 305 may determine that the majority of the time that the communication device 105 transmits a registration request from a bus depot at seven in the morning, the affiliated talk group of the communication device 105 is talk group A. Accordingly, the second electronic processor 305 determines that the predicted affiliated talk group of the communication device 105 is talk group A when such a registration request is received. As another example, the second electronic processor 305 may determine that the previously stored communication device configuration data states indicate that the communication device 105 has been affiliated with talk group B every time a registration request from the communication device is received at a particular site controller (in other words, every time the communication device 105 is located near a particular area). Accordingly, the second electronic processor 305 determines that the predicted talk group is talk group B when such a registration request is received.

The above situations are merely exemplary. In some embodiments, the second electronic processor 305 may use additional or fewer factors to determine the predicted affiliated talk group of the communication device 105. For example, the second electronic processor 305 may determine the predicted affiliated talk group based on only one of the location of the communication device 105 and the time of day at which the registration request was received. In some embodiments, the factors used to determine the predicted affiliated talk group of the communication device 105 may carry the same weight. In other embodiments, these factors may carry different weight.

After the second electronic processor 305 determines the predicted affiliated talk group of the communication device 105, the controller 115 assigns the communication device 105 to the predicted affiliated talk group. For example, the controller 115 stores an identification of the communication device 105 and the predicted affiliated talk group in the second memory 310. When the predicted affiliated talk group becomes active in the future (in other words, when a call begins on the talk group), the controller 115 then transmits a call grant to the site controller used to control communication of the communication device 105 as mentioned previously. In some embodiments, the controller 115 assigns the communication device 105 to the predicted affiliated talk group without receiving a talk group affiliation request from the communication device 105. The controller 115 also performs other steps of the registration process based on the predicted communication device configuration data. For example, based on previously stored communication device configuration data states in the second memory 310, the second electronic processor 305 may determine the data capability level and the location capability level of the communication device 105. The second electronic processor 305 may then register the communication device 105 with the data server 120 (to perform context activation and obtain an assigned Internet Protocol address as explained previously) without receiving a request from the communication device 105 to do so. The second electronic processor 305 may also register the communication device 105 with the location server 130 (to provide location update parameters to the communication device 105 as explained previously) without receiving a request from the communication device 105 to do so.

In some embodiments, based on previously stored communication device configuration data states in the second memory 310, the second electronic processor 305 may determine a predicted list of scanned talk groups of the communication device 105. For example, the second electronic processor 305 may determine the predicted list of scanned talk groups in a similar manner as described previously herein with respect to the predicted affiliated talk group of the communication device 105. The controller 115 then may assign the communication device 105 to the talk groups on the predicted list of scanned talk groups. For example, the controller 115 stores an identification of the communication device 105 and the predicted list of scanned talk groups in the second memory 310. When any of the talk groups in the predicted list of scanned talk groups become active in the future (in other words, when a call begins on the talk group), the controller 115 then transmits a call grant to the site controller used to control communication of the communication device 105 to allow the communication device 105 to receive the call.

After the controller 115 has completed the registration process for the communication device 105, at block 415, the second electronic processor 305 transmits a message to the communication device 105 via the second network interface 315. The message includes at least a portion of the predicted communication device configuration data determined by the second electronic processor 305. For example, the message may include at least one of the predicted affiliated talk group and the predicted list of scanned talk groups. In some embodiments, the message includes other registration information and other information included in the predicted communication device configuration data. For example, the message may also include at least one of the assigned Internet Protocol address of the communication device 105, a predicted data capability level of the communication device 105, a predicted location capability level of the communication device 105, and location update parameters of the communication device 105. In some embodiments, the controller 115 transmits the message to the communication device 105 without the controller 115 receiving at least one of a talk group affiliation request from the communication device 105, an Internet Protocol address request (in other words, a data channel request) from the communication device 105, and a location update parameter request from the communication device 105.

When the predicted communication device configuration data is correct, no further action is taken by the communication device 105 or the controller 115. Accordingly, in many situations, the method 400 reduces inbound request traffic from communication devices 105 attempting to register to the network 110. For example, in many situations, the controller 115 is able to register the communication device 105 with the network 110 by receiving a single registration request and by transmitting a single confirmation message to the communication device 105 that includes the predicted communication device configuration data and other information based on the predicted communication device configuration data.

In some situations, at least a portion of the predicted communication device configuration data included in the message from the controller 115 is incorrect. For example, the predicted affiliated talk group of the communication device may be incorrect because it does not match a desired affiliated talk group stored in the first memory 210 of the communication device 105. As another example, one or more of the talk groups on the predicted list of scanned talk groups of the communication device 105 may be incorrect because the predicted list of scanned talk groups does not correspond exactly to the list of scanned talk groups stored in the first memory 210. In such situations, the communication device 105 transmits a response message to controller 115 that indicates that at least a portion of the predicted communication device configuration data is incorrect. In some situations, the communication device 105 may also transmit second registration request to the controller 115 to register without using the predicted communication device configuration data.

Figure 5:
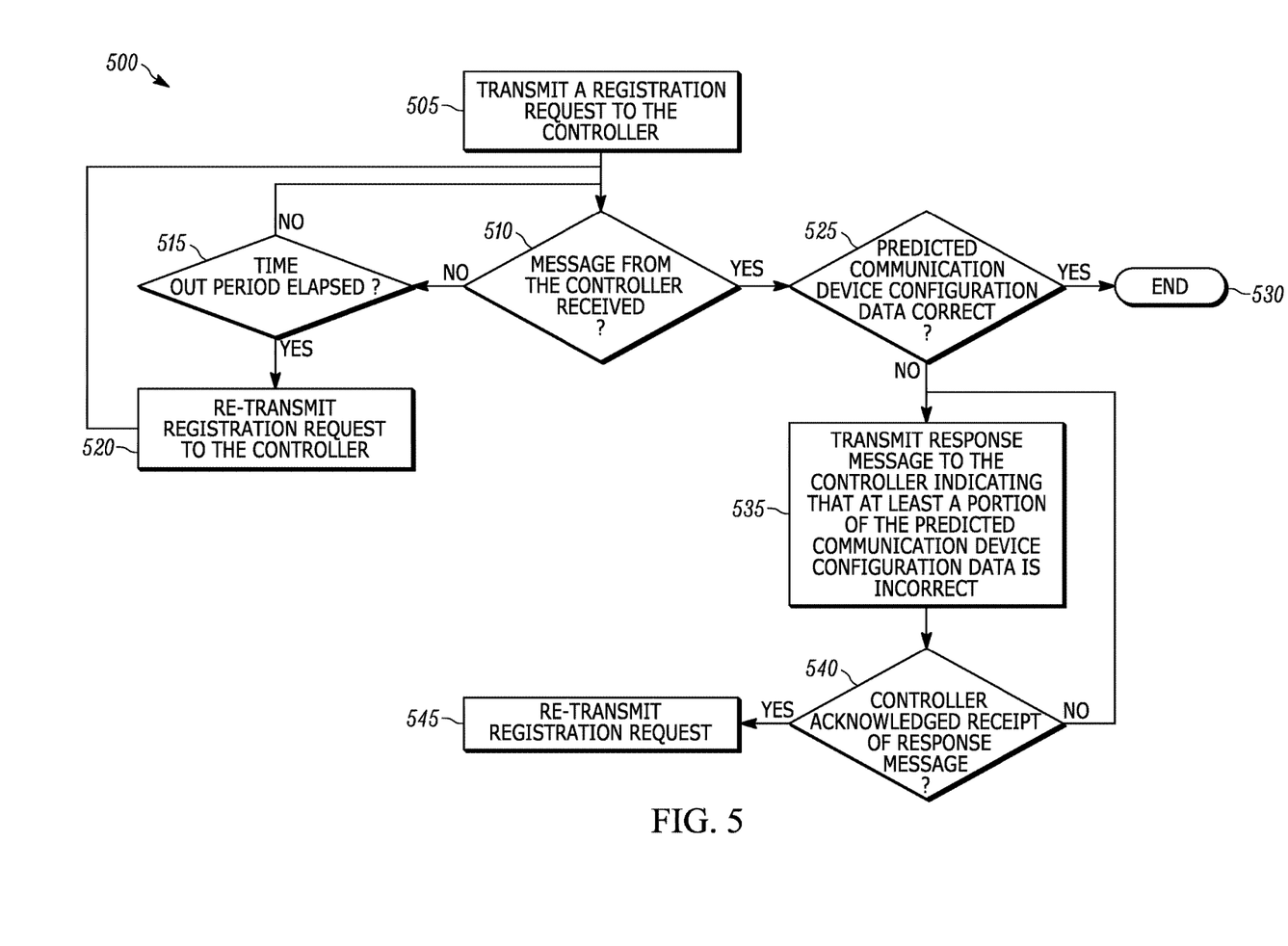
FIG. 5 is a flowchart of a method of registering the communication device of FIG. 2 with a network that is performed by the communication device of FIG. 2 according to one embodiment.

FIG. 5 illustrates an example method 500 performed by the communication device 105 in conjunction with the method 400 performed by the controller 115. At block 505, the communication device 105 transmits the registration request to the controller 115 as explained previously. When the controller 115 receives the registration request, the second electronic processor 305 executes the method 400 of FIG. 4 as explained previously. However, the registration request from the communication device 105 is often sent over a random access inbound communication channel. Depending on other inbound traffic on the inbound communication channel, the controller 115 may not receive the registration request transmitted by the communication device 105. As explained below, the communication device 105 uses a time out period to determine whether to transmit another registration request to the controller 115.

After transmitting the registration request, at block 510, the first electronic processor 205 of the communication device 105 determines whether a message from the controller 115 has been received (in other words, the message indicating the predicted communication device configuration data explained previously). When the communication device 105 has not received the message from the controller 115, at block 515, the first electronic processor 205 determines whether the time out period has elapsed since the registration request was transmitted. When the time out period has not elapsed, the communication device 105 continues to wait for the message from the controller 115 (at block 510). When the time out period has elapsed, at block 520, the communication device 105 re-transmits the registration request to the controller 115, and the method 500 proceeds back to block 510.

At block 510, when the communication device 105 receives the message from the controller 115, at block 525, the first electronic processor 205 determines whether the predicted communication device configuration data is correct. For example, the first electronic processor 205 compares the predicted affiliated talk group to a desired affiliated talk group stored in the first memory 210 of the communication device 105. In some embodiments, the first electronic processor 205 also compares the predicted list of scanned talk groups to a desired list of scanned talk groups saved in the first memory 210. When the predicted communication device configuration data is correct, the method terminates at block 530 because the controller 115 has properly registered the communication device 105 with the network 110. On the other hand, when at least a portion of the predicted communication device configuration data is incorrect, at block 535, the communication device 105 transmits a response message to the controller 115 indicating that at least a portion of the predicted communication device configuration data is incorrect. At block 540, the first electronic processor 205 determines whether the controller 115 has acknowledged receipt of the response message from the communication device 105. When the controller 115 has not acknowledged receipt of the response message, the communication device 105 re-transmits the response message, for example, after a predetermined time period. When the controller 115 has acknowledged receipt of the response message, at block 545, the communication device 105 re-transmits the registration request (in other words, a second registration request). The communication device 105 will then be registered with the network 110 without using the predicted communication device configuration data as explained with respect to FIG. 6 below. In other words, in such situations, the controller 115 registers the communication device 105 with the network 110 using the previous registration process that involves transmitting numerous messages back and forth between the controller 115 and the communication device 105.

Figure 6:
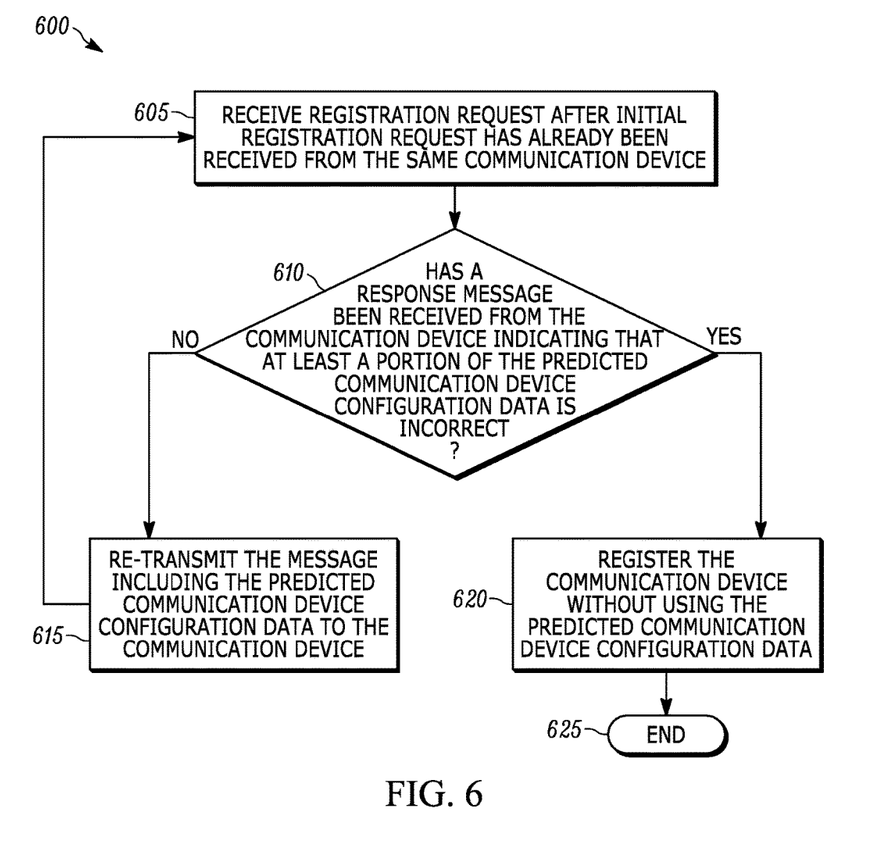
FIG. 6 is a flowchart of a method of communicating with the communication device of FIG. 2 that is performed by the controller of FIG. 3 to determine how to register the communication device with the network.

FIG. 6 illustrates an example method 600 performed by the controller 115 to determine whether to use the method 400 or the previous registration process to register the communication device 105. At block 605, the controller 115 receives a registration request after an initial registration request has already been received from the same communication device 105.

At block 610, the second electronic processor 305 determines whether a response message has been received by the controller 115 from the communication device 105 indicating that at least a portion of the predicted communication device configuration data is incorrect. When the controller 115 has not received such a response message from the communication device 105, at block 615, the controller 115 re-transmits the message including the predicted communication device configuration data to the communication device 105. For example, this situation may occur when the communication device 105 times out before receiving the message from the controller 115. Because the communication device 105 did not receive the message including the predicted communication device configuration data in this situation, the controller 115 re-transmits this message. The method 600 then proceeds back to block 605 to continue to monitor for another registration request received from the same communication device 105.

When the controller 115 has received a response message from the communication device 105 indicating that at least a portion of the predicted communication device configuration data is incorrect (as determined at block 610), at block 620, the controller 115 registers the communication device 105 without using the predicted communication device configuration data. In other words, the controller 115 registers the communication device 105 with the network 110 using the previous registration process that involves transmitting numerous messages back and forth between the controller 115 and the communication device 105. After the controller 115 registers the communication device 105 with the network 110, the method 600 terminates at block 625.

In some embodiments, the controller 115 registers the communication device 105 according to the previous registration process only when a certain portion of the predicted communication device configuration data is incorrect (for example, when the predicted affiliated talk group is incorrect). In some embodiments, when only the predicted list of scanned talk groups is incorrect, the communication device 105 may transmit a delta message (instead of the response message of block 540 of FIG. 5) to the controller 115 indicating the errors in the predicted list of scanned talk groups. For example, the delta message indicates talks groups that should be removed from the list and talk groups that should be added to the list. Upon receipt of the delta message, the controller 115 corrects assignments of scanned talks groups for the communication device 105 according to information included in the delta message (for example, by correcting the information previously stored in the second memory 310). In some embodiments, the controller 115 then transmits a message back to the communication device 105 to acknowledge receipt of the delta message. In this example, the communication device 105 remains registered with the network 110 and does not re-transmit a registration request to register with the network 110. Rather, the controller 115 corrects the errors in the predicted communication device configuration data (in other words, the errors in the predicted list of scanned talk groups) based on the delta message received from the communication device 105.

After the communication device 105 is registered with the network 110 using correct communication device configuration data (whether such data is predicted by the controller 115 using the method 400 or communicated to the controller 115 using the previous registration process), the second electronic processor 305 stores the correct communication device configuration data in the second memory 310 for future use as explained previously.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for reducing inbound request traffic in a wireless network, the method comprising:
   receiving, via a network interface of a controller, a registration request from a communication device;
   determining, with an electronic processor of the controller and in response to receiving the registration request, predicted communication device configuration data as a function of a plurality of previously stored communication device configuration data states associated with the communication device; and
   transmitting, with the electronic processor via the network interface, a message to the communication device, the message including at least a portion of the predicted communication device configuration data.

2. The method of claim 1, wherein transmitting the message to the communication device includes transmitting the message to the communication device without the controller receiving a talk group affiliation request from the communication device.

3. The method of claim 1, wherein determining the predicted communication device configuration data includes determining the predicted communication device configuration data, the predicted communication device configuration data including at least one of a predicted affiliated talk group and a predicted list of scanned talk groups;
   wherein transmitting the message to the communication device includes transmitting the message to the communication device, the message including at least one of the predicted affiliated talk group and the predicted list of scanned talk groups.

4. The method of claim 1, further comprising registering, with the controller, the communication device with the wireless network using at least a portion of the predicted communication device configuration data that was not included in the registration request.

5. The method of claim 1, wherein determining the predicted communication device configuration data includes determining at least a portion of the predicted communication device configuration data based on at least one of location of the communication device when the registration request was received and a time of day at which the registration request was received.

6. The method of claim 1, further comprising:
   receiving, via the network interface, a response message from the communication device, the response message indicating that at least a portion of the predicted communication device configuration data is incorrect;
   receiving, via the network interface, a second registration request from the communication device;
   determining, with the electronic processor, that the controller has received the response message from the communication device indicating that at least a portion of the predicted communication device configuration data is incorrect; and
   registering, with the electronic processor, the communication device with the wireless network without using the predicted communication device configuration data.

7. The method of claim 6, wherein receiving the response message from the communication device includes receiving the response message from the communication device, the response message indicating that a predicted affiliated talk group of the communication device is incorrect.

8. The method of claim 6, further comprising:
   storing, with the electronic processor, correct communication device configuration data from the communication device in a memory of the controller as one of the plurality of previously stored communication device configuration data states associated with the communication device; and
   storing, with the electronic processor, a time of day at which the second registration request was received and a location of the communication device based on a site at which the second registration request was received, the time of day and the location of the communication device being associated with the correct communication device configuration data in the memory.

9. A controller that communicates over a wireless network, the controller comprising:
   a memory;
   a network interface; and
   an electronic processor;
   wherein the controller is configured to
     receive, via the network interface, a registration request from a communication device,
     determine, with the electronic processor in response to receiving the registration request, predicted communication device configuration data as a function of a plurality of previously stored communication device configuration data states associated with the communication device, and
     transmit, with the electronic processor via the network interface, a message to the communication device, the message including at least a portion of the predicted communication device configuration data.

10. The controller of claim 9, wherein the controller transmits the message to the communication device without receiving a talk group affiliation request from the communication device.

11. The controller of claim 9, wherein the predicted communication device configuration data includes at least one of a predicted affiliated talk group and a predicted list of talk scanned groups;
   wherein the message to the communication device includes at least one of the predicted affiliated talk group and the predicted list of scanned talk groups.

12. The controller of claim 9, wherein the controller is further configured to register the communication device with the wireless network using at least a portion of the predicted communication device configuration data that was not included in the registration request.

13. The controller of claim 9, wherein the controller determines at least a portion of the predicted communication device configuration data based on at least one of location of the communication device when the registration request was received and a time of day at which the registration request was received.

14. The controller of claim 9, wherein the controller is further configured to:
receive, via the network interface, a response message from the communication device, wherein the response message indicates that at least a portion of the predicted communication device configuration data is incorrect;
receive, via the network interface, a second registration request from the communication device;
determine, with the electronic processor, that the controller has received the response message from the communication device; and
register, with the electronic processor, the communication device with the wireless network without using the predicted communication device configuration data.

15. The controller of claim 14, wherein the response message indicates that a predicted affiliated talk group of the communication device is incorrect.

16. The controller of claim 14, wherein the controller is further configured to:
store, with the electronic processor, correct communication device configuration data from the communication device in the memory as one of the plurality of previously stored communication device configuration data states associated with the communication device; and
store, with the electronic processor, a time of day at which the second registration request was received and a location of the communication device based on a site at which the second registration request was received, wherein the time of day and the location of the communication device are associated with the correct communication device configuration data in the memory.

17. A wireless communication system comprising:
a communication device including a first memory, a first network interface, and a first electronic processor; and
a controller configured to communicate with the communication device over a wireless network, the controller including a second memory, a second network interface, and a second electronic processor;
wherein
the communication device is configured to transmit a registration request to the controller,
the controller is configured to determine predicted communication device configuration data as a function of a plurality of previously stored communication device configuration data states associated with the communication device,
the controller is configured to transmit a message to the communication device, the message including at least a portion of the predicted communication device configuration data, and
the communication device is configured to determine whether the predicted communication device configuration data is correct.

18. The wireless communication system of claim 17, wherein the predicted communication device configuration data includes at least one of a predicted affiliated talk group and a predicted list of talk scanned groups;
wherein the message to the communication device includes at least one of the predicted affiliated talk group and the predicted list of scanned talk groups.

19. The wireless communication system of claim 18, wherein the communication device is further configured to
determine that the predicted affiliated talk group does not match a desired affiliated talk group stored in the first memory;
transmit a response message to the controller indicating that the predicted affiliated talk group does not match the desired affiliated talk group stored in the first memory; and
transmit a second registration request to the controller.

20. The wireless communication system of claim 18, wherein
the communication device is configured to determine that the predicted list of scanned talk groups is incorrect;
the communication device is configured to transmit a delta message to the controller indicating errors in the predicted list of scanned talk groups; and
the controller is configured to receive the delta message and correct assignments of scanned talks groups for the communication device according to information included in the delta message.

* * * * *